United States Patent [19]

Vannoy et al.

[11] Patent Number: 4,962,945
[45] Date of Patent: Oct. 16, 1990

[54] EASY HITCHING MECHANISM

[75] Inventors: Ray Vannoy; Robert W. Miller, both of Corning, Ark.

[73] Assignee: Scott Manatt, Corning, Ark.

[21] Appl. No.: 374,834

[22] Filed: Jul. 3, 1989

[51] Int. Cl.$^5$ .............................................. B60D 1/00
[52] U.S. Cl. .................................. 280/508; 280/509; 280/514; 213/139; 213/141
[58] Field of Search ............... 280/508, 509, 510, 514, 280/504, 512, 477; 172/272, 275; 213/75 R, 93, 95, 139, 141, 172, 173

[56] References Cited

U.S. PATENT DOCUMENTS

| 315,495 | 4/1885 | Goettel et al. | 213/141 |
|---|---|---|---|
| 445,243 | 1/1891 | Flohr | 213/139 |
| 776,292 | 11/1904 | Buller | 280/508 |
| 1,240,818 | 9/1917 | Buller | 280/508 |
| 1,824,843 | 9/1931 | Staley | 280/504 |
| 2,107,312 | 2/1938 | Thompson | 280/509 |
| 2,120,415 | 6/1938 | Meyer | 280/503 |
| 2,591,916 | 4/1952 | Caughman | 280/504 |
| 2,666,653 | 1/1954 | Diuble | 280/508 |
| 2,812,195 | 11/1957 | Kelley | 280/510 |
| 2,844,390 | 7/1958 | Smith | 280/508 |
| 2,935,145 | 5/1960 | Du Shane et al. | 172/275 |
| 3,565,459 | 2/1971 | Reid | 280/510 |
| 4,408,778 | 10/1983 | Steuben | 280/510 |
| 4,792,151 | 12/1988 | Feld | 280/477 |

FOREIGN PATENT DOCUMENTS

| 436624 | 11/1926 | Fed. Rep. of Germany | 280/510 |
|---|---|---|---|
| 2154972 | 9/1985 | United Kingdom | 213/75 R |

Primary Examiner—David M. Mitchell
Assistant Examiner—A. M. Boehler
Attorney, Agent, or Firm—H. Jay Spiegel

[57] ABSTRACT

The present invention relates to a hitching device designed to be used to detachably connect two vehicles together. The hitching mechanism includes two jaws which may pivot with respect to one another in a controlled manner by virtue of intermeshing gearing therebetween. The ends of the jaws have a complimentary tongue and groove connection to facilitate resistance of forces which would tend to separate the jaws in the absence thereof. A lock block is provided to control locking and unlocking of the jaws, while a safety pin is provided to protect against undesired jaw movements.

9 Claims, 3 Drawing Sheets

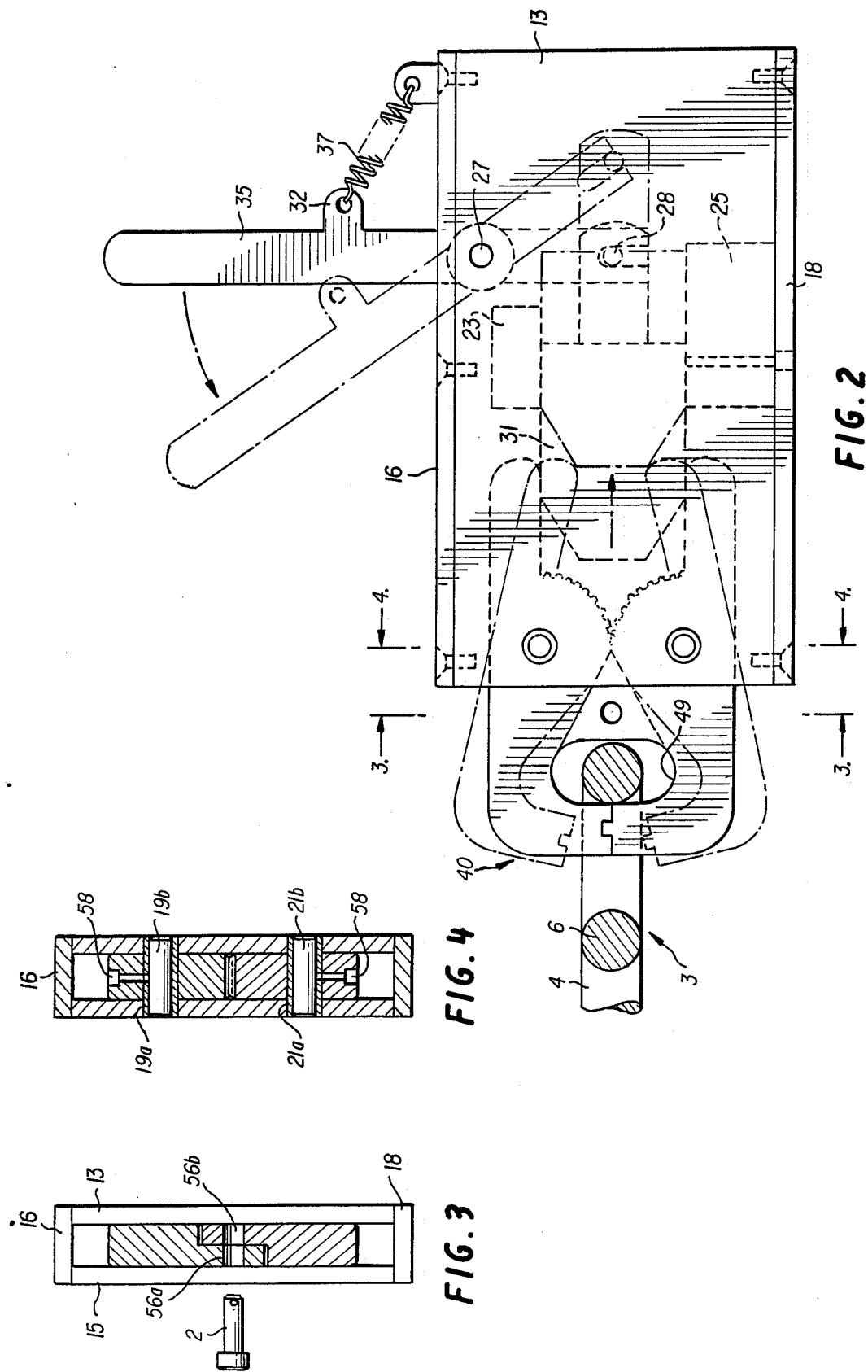

EASY HITCHING MECHANISM

BACKGROUND OF THE INVENTION

The present invention relates to an easy hitching mechanism. In the prior art, hitches are known per se; however, applicants are unaware of any hitching mechanism including all of the features included in the present invention.

The following prior art is known to applicants:

U.S. Pat. No. 2,812,195 to Kelley discloses a hitch including two mutually pivotable jaws and a locking mechanism which may be inserted between the jaws remote from the hitching area to lock the jaws in hitched configuration. This is different from the teachings of the present invention since, in the present invention, the locking mechanism moves in the same plane as the jaws. Furthermore, Kelley fails to teach the intermeshing gearing of the present invention, nor the tongue and groove connection thereof, nor other features.

U.S. Pat. No. 2,844,390 to Smith discloses a hitch having a reciprocating spring-biased pin which may be retracted to allow coupling to take place and which may then be extended to complete the coupling. This patent is believed to be of only general interest concerning the teachings of the present invention.

U.S. Pat. No. 3,565,459 to Reid discloses an automatic hitch including a slot through which a latch plate pivotably extends, which latch plate may be used to automatically perform a hitching movement responsive to engagement by another portion of the hitch. The present invention is different from the teachings of Reid for many reasons, including the fact that the present invention includes two mutually pivotable jaws pivoted in conjunction with one another due to the inclusion of intermeshing gearing, as well as a lock block movable in the plane of the jaws. Other differences exist.

U.S. Pat. No. 4,408,778 to Steuben discloses a hitching mechanism including two mutually pivotable jaws which may be moved by engagement of another hitching portion to separate the jaws, allow the hitching portion to be located between the jaws and then close about that hitching portion, whereupon a locking member may be inserted between the jaws transversely thereto.

The present invention differs from the teachings of Steuben for many reasons, including the fact that the lock block of the present invention moves in the plane of the jaws, including the intermeshing gearing, and for other reasons.

SUMMARY OF THE INVENTION

The present invention relates to an easy hitching mechanism. The present invention includes the following interrelated aspects and features:

(a) In a first aspect, the inventive hitching mechanism includes two jaws which are mounted together in such a manner that they may pivot with respect to one another to open and close a forward portion thereof, revealing a recess just behind the forward portion.

(b) At a rearward portion of the jaws, each jaw is provided with an arcuate geared surface, with the respective geared surfaces of the jaws being enmeshed with one another so that movements of one jaw directly correspond to movements of the other jaw.

(c) Behind these arcuate surfaces, each jaw is provided with a flat surface, with these flat surfaces of the jaws lying in parallel planes to one another when the forward portions of the jaws engage one another.

(d) The inventive hitching mechanism includes a lock block having opposed sides with flat surfaces lying in parallel planes. The lock block is designed to be reciprocable between two guide blocks through controlled movements of an actuator mechanism which is biased in a direction urging the lock block toward the rearward portion of the jaws. The lock block is sized and configured to be insertable between the rearward flat surfaces of the jaws to lock the jaws in a position with the forward portions thereof in tight engagement.

(e) The forward portions of the jaws are provided with a tongue and groove interconnection, with one of the forward portions having the tongue portion and the other of the forward portions having the groove portion. When the forward portions of the jaws engage one another, the tongue and groove connection assists in preventing movements perpendicular to the movements of the forward portions with respect to one another from separating the forward portions.

(f) The jaws and lock block are mounted within a housing having two side walls perpendicular to the above-described guide blocks. The side walls guide the jaws in pivoting movements while maintaining the jaws in alignment with one another to keep the arcuate geared surfaces enmeshed and the tongue and groove connection in alignment.

As such, it is a first object of the present invention to provide an improved easy hitching mechanism.

It is a further object of the present invention to provide such a hitching mechanism with two mutually pivotable jaws guided through a gearing mechanism.

It is a further object of the present invention to provide such a hitching mechanism with a lock block movable in a plane common to the plane of the jaws to enhance compactness of the hitching mechanism.

It is a yet further object of the present invention to provide such a hitching mechanism with a tongue and groove connection interconnecting when the forward portions of the jaws are engaged to assist in maintaining the integrity of a hitched configuration thereof.

These and other objects, aspects and features of the present invention will be better understood from the following detailed description of the preferred embodiment when read in conjunction with the appended drawing figures.

BRIEF DESCRIPTION OF THE DRAWINGS

FIG. 2 shows a side view of a portion of the present invention with certain portions thereof removed for clarity.

FIG. 3 shows a cross-sectional view along the line 3—3 of FIG. 2.

FIG. 4 shows a cross-sectional view along the line 4—4 of FIG. 2.

SPECIFIC DESCRIPTION OF THE PREFERRED EMBODIMENT

Figure 1:
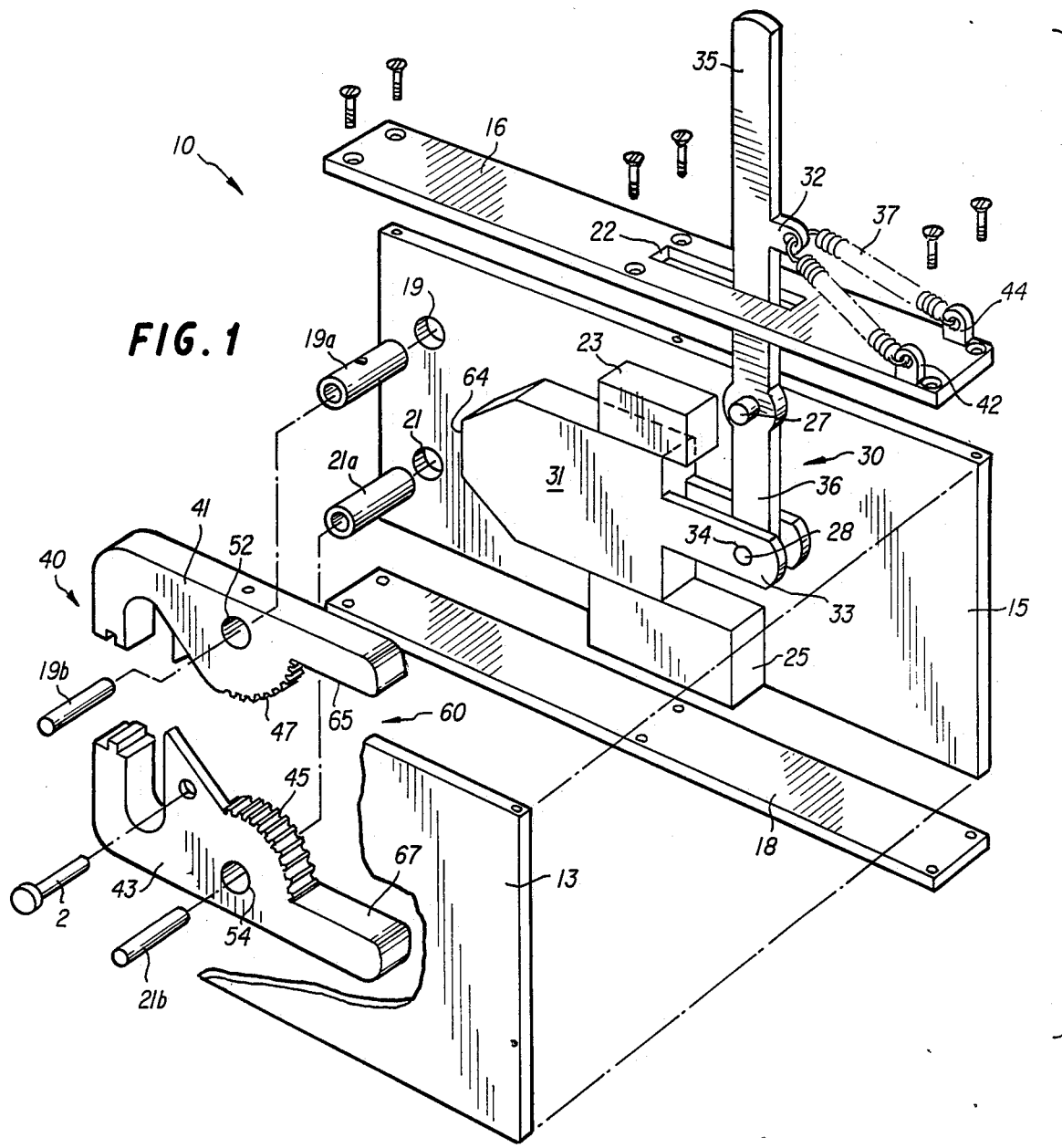
FIG. 1 shows an exploded perspective view of the preferred embodiment of the present invention.

With reference, first, to FIG. 1, the inventive hitching mechanism is generally designated by the reference numeral 10 and is seen to include a housing 11 having side walls 13, 15, and top and bottom walls 16 and 18. Each of the side walls 13, 15 has a pair of openings therethrough with the openings in the wall 15 being shown and designated by the reference numerals 19 and 21. These holes are for a purpose to be described in greater detail hereinafter.

Within the housing 11, extending between the side walls 13, 15, two guide blocks 23 and 25 are installed which are provided to guide the reciprocatory movements of a lock block mechanism 30. A pivot pin 27 is also mounted between the side walls 13, 15 of the housing 11 for a purpose to be described in greater detail hereinafter.

With further reference to FIGS. 1, 2, 5 and 6, a lock block mechanism 30 is seen to include a lock block 31 slidably contained between the guide blocks 23, 25 as well as a coupler 33 having an opening 34 therethrough to which is coupled by pin 28 the distal end 36 of a release lever 35 which pivots about the pivot pin 27. A slot 22 is formed in the wall 16 to allow pivotable movements of the release lever 35. Furthermore, springs 37 are mounted to the release lever 35 at the attachment 32 and are attached to the top wall 16 at the attachments 42 and 44.

With further reference to the figures, a jaw mechanism 40 includes a first jaw 41 and a second jaw 43. In the preferred embodiment of the present invention, the second jaw 43 is made heavier than the first jaw 41 so that when the lock block 31 is removed from between the rear portion 60 of the jaw mechanism 40, the greater weight of the second jaw 43 will cause the jaw 43 to pivot downwardly, thereby causing upward pivoting of the jaw 41 for reasons to be described in greater detail hereinafter.

The jaws 41 and 43 have, respectively, arcuate geared surfaces 47 and 45 which are enmeshed so that movements of one jaw will result in corresponding movements of the other jaw. Furthermore, the jaw 41 has an opening 52 therethrough while the jaw 43 has an opening 54 therethrough. These openings are provided to allow respective pivot pins 19, 21 to extend therethrough as well as through the pivot pin holes in the side walls 13 and 15 of the housing of which the pivot pin holes 19 and 21 are shown in FIG. 1. Each pivot pin consists of a bushing 19a, 21a and a pin 19b, 21b.

The forward portion 50 of the jaw mechanism 40 includes a tongue and groove connection including a groove 51 on the jaw 41 forward portion 46 and a tongue 53 on the jaw 43 forward portion 48. A hole 56a, 56b is provided (FIG. 3) which extends through both jaws 41, 43 so that a pin 2 may be inserted through the hole 56a, 56b to lock the jaws 41, 43 together. A grease fitting 58 (FIG. 4) may be provided allowing grease to be inserted into each pivot pin hole 52, 54.

Shown in phantom in FIG. 2 is a coupler 3 including an elongated rod 4 designed to be attached to a vehicle and having attached thereto a ring 6 adapted to be received within the opening 49 in the jaw mechanism 40.

Figure 7:
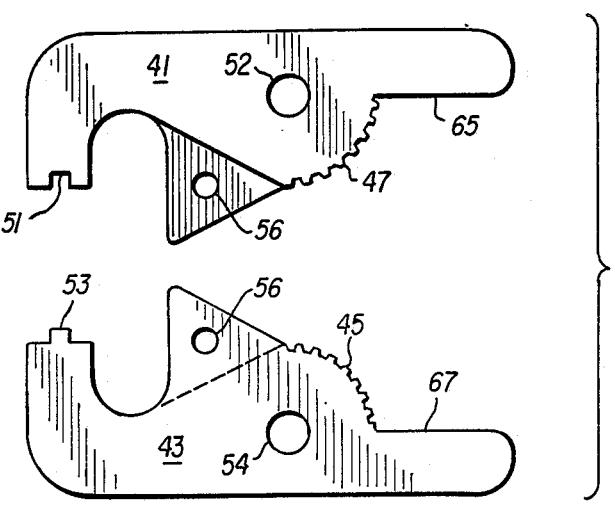
FIG. 7 shows an exploded side view of the jaws of the present invention.
Figure 5:
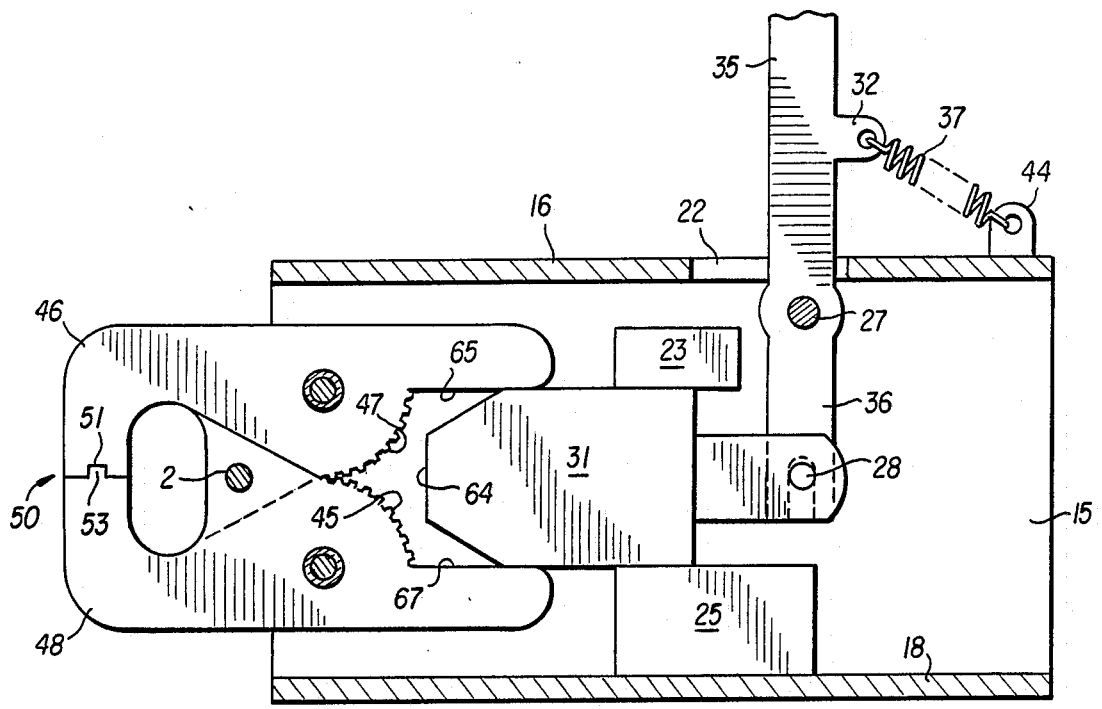
FIG. 5 shows a side view of the invention in one operative position thereof.
Figure 6:
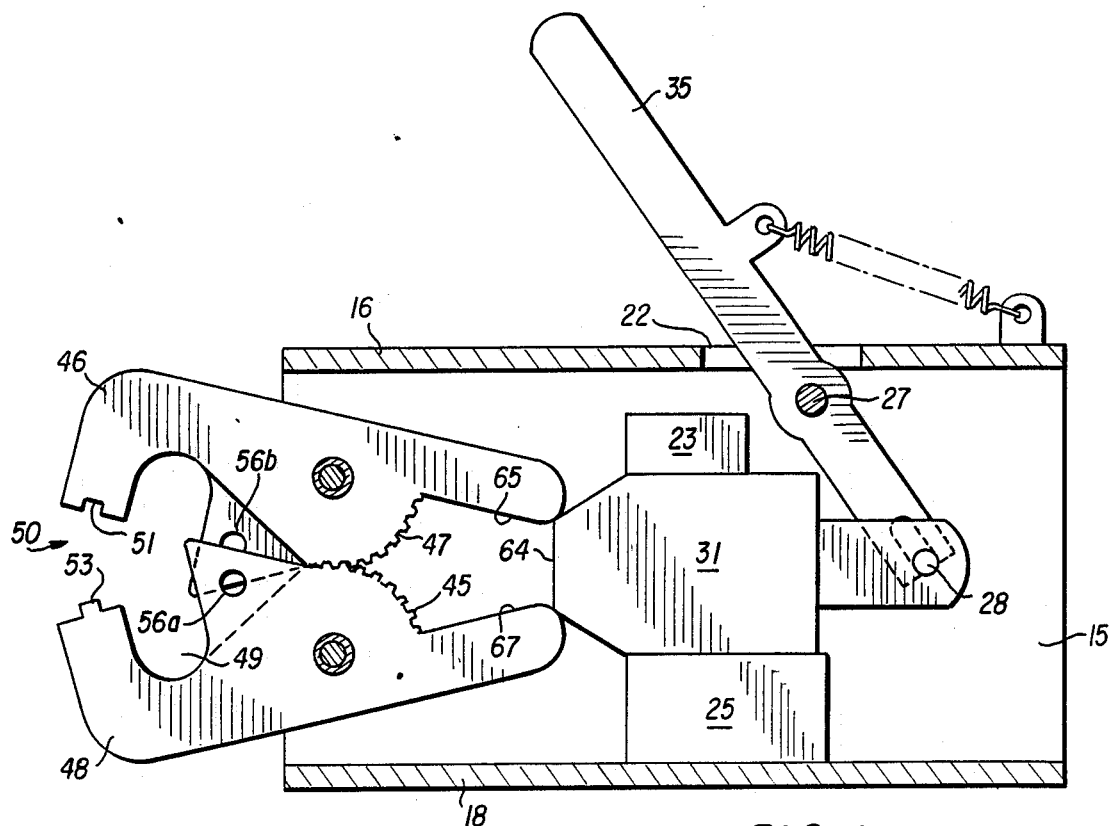
FIG. 6 shows a side view of the invention in another operative position thereof.

With reference to FIGS. 5, 6 and 7, it should be understood that portions of both jaws 41, 43 extend in overlapping relation to the area where the safety pin hole 56 extends so that the safety pin hole may receive the safety pin 2 to hold the jaws together.

As should be understood from the figures, the intended orientation of the inventive easy hitching mechanism 10 is with the jaw 41 above the jaw 43 to take advantage of the greater weight of the jaw 43 for the reasons set forth hereinabove.

With the specific details of the present invention having been described in great detail, the intended mode of operation of the inventive easy hitching mechanism will now be described. When it is desired to utilize the inventive easy hitching mechanism 10 to hitch together two vehicles, the release lever 35 is pivoted forward (or clockwise) in the view of the Figures to cause the lock block 31 to be moved away from the jaw mechanism 40 and out of engagement of the surfaces 65, 67 of the rearward portion 60 of the jaw mechanism 40.

In this position of the lock block 31 (FIG. 6), the greater weight of the jaw 43 will cause the jaw 43 to begin to pivot counterclockwise in the view of FIG. 6. Due to the enmeshing of the geared arcuate surfaces 45, 47, movements of the jaw 43 in the counterclockwise direction will result in equal movements of the jaw 41 in the clockwise direction, thereby separating the tongue and groove connection 53, 51 and separating the forward portion 50 of the jaw mechanism 40 to allow access to the opening 49 between the jaws 41, 43.

In this position of the jaw mechanism 40, with the surfaces 65, 67 of the rearward portion 60 of the jaw mechanism 40 lying in close adjacency, the release lever 35 may be released so that the biasing force of the springs 37 will pivot the release lever clockwise in the view of FIGS. 1 and 3 to cause the forward surface 64 of the lock block 31 to engage the rearward portion 60 of the jaw mechanism 40. This engagement will tend to enhance the maintenance of the jaws 41, 43 in a position of separation allowing access to the opening 49 therebetween. In this position, the coupler 3, ring 6 may be inserted into the opening 49 between the jaws 41, 43 in such a manner that when the ring 6 engages or bumps against the rear surfaces of the opening 49, such interaction will automatically cause the jaws 41, 43 to clamp shut, interengaging the tongue and groove connection 53, 51. In such position, with the surfaces 65, 67 being restored to parallel position with respect to one another, and with the lock block 31 engaging the rearward portion 60 of the jaw mechanism 40, the biasing force of the springs 37 will cause the lock block to enter the rearward portion 60 of the jaw mechanism 40 between the surfaces 65, 67 to the position shown in FIGS. 1 and 2, thereby locking the jaw mechanism 40 about the ring 6. In this position, the safety pin 2 may be inserted through the safety pin hole 56 to complete the interconnection. Furthermore, the tongue and groove connection 53, 51 allows the jaw mechanism 40 to further resist forward movements of the ring 6 with respect thereto, since the side edges of the tongue and groove provide surfaces of interaction resisting forces generated by relative movements between the ring 6 and the forward portion 50 of the jaw mechanism 40.

If desired, the pivot pin holes, 19 and 21 shown, may have the respective bushings 19a, 21a inserted therein which are easily replaceable when worn.

As such, an invention has been disclosed in terms of a preferred embodiment thereof which fulfills each and every one of the objects of the invention, as set forth hereinabove, and provides a new and improved easy hitching mechanism which greatly advances the state of the art. Of course, various changes, modifications and alterations in the teachings of the present invention may be contemplated by those skilled in the art without departing from the intended spirit and scope of the present invention. As such, it is intended that the present invention only be limited by the terms of the appended claims.

We claim:

1. A hitching mechanism comprising:
   (a) a jaw mechanism having:
      (i) upper and lower pivoting jaws with mutually interacting guiding surfaces, said mutually interacting guiding surfaces each comprising an arcuate surface with gear teeth thereon, the gear teeth of said surfaces being enmeshed so that movements of one jaw result in corresponding movements of the other jaw;
      (ii) each of said jaws having a forward portion and a rearward portion;
      (iii) said forward portions combining to define an opening closeable by engagement of two forward surfaces, one surface on each of said jaws, said surfaces, when engaged, having an interconnection;
      (iv) said rearward portion including a first portion on said upper jaw and a second surface on said lower jaw;
   (b) locking means including a lock block movable in a direction toward said forward portions between said first and second surfaces when said forward surfaces are in engagement to lock said forward surfaces in engagement, thereby closing and locking said opening;
   (c) said lower jaw being heavier than said upper jaw, whereby when said lock block is removed from between said first and second surfaces, the force of gravity causes said lower jaw to pivot to an open position, interaction of said guiding surfaces causing corresponding movements of said upper jaw.

2. The invention of claim 1, wherein said interconnection between said forward surfaces comprises a tongue and groove coupling.

3. The invention of claim 1, further including a substantially linear bore extending through both said upper and lower jaws when said forward surfaces are engaged and, in such position, adapted to receive a safety pin retaining said forward surfaces in engagement.

4. The invention of claim 1, wherein each said jaw includes a pivot pin opening therethrough adapted to receive a pivot pin about which each said jaw may pivot.

5. The invention of claim 1, wherein said jaw mechanism and locking means are mounted in a housing with said forward portion of said jaws protruding therefrom, said housing carrying a pivotable lever attached to said lock block with a pivoting connection translating pivoting movements of said lever into reciprocations of said lock block.

6. The invention of claim 5, wherein said lever is resiliently biased in a direction tending to move said lock block between said first and second surfaces.

7. The invention of claim 5, wherein said housing includes guide means for guiding said reciprocations of said lock block.

8. The invention of claim 7, wherein said guide means includes at least one guide block in sliding engagement with said lock block.

9. The invention of claim 1, wherein all movements of said jaws and lock block are in substantially in common plane.

* * * * *